Jan. 19, 1965    G. BONNET ETAL    3,166,707
NUCLEAR MAGNETOMETERS OF THE TYPE MAKING USE OF A HIGH
FREQUENCY PUMPING ON AN ELECTRONIC TRANSITION
Filed July 18, 1961    3 Sheets-Sheet 1

INVENTORS
GEORGES BONNET
ANTOINE SALVI
BY

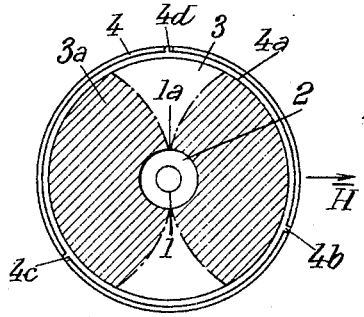
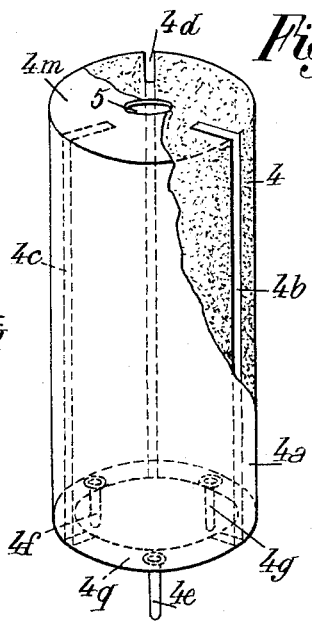
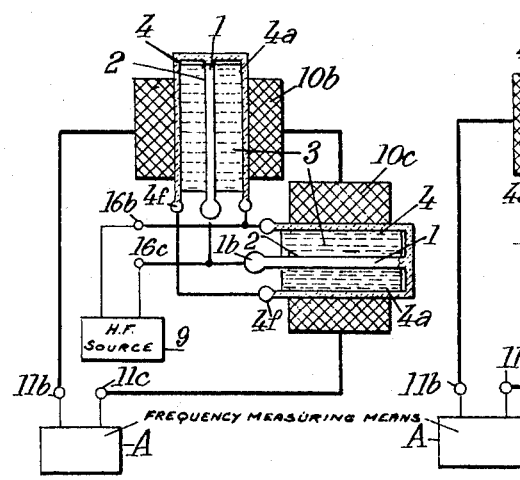
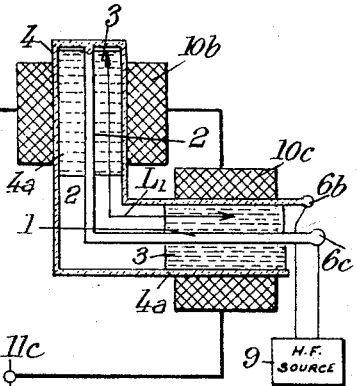

Jan. 19, 1965 G. BONNET ETAL 3,166,707
NUCLEAR MAGNETOMETERS OF THE TYPE MAKING USE OF A HIGH
FREQUENCY PUMPING ON AN ELECTRONIC TRANSITION
Filed July 18, 1961 3 Sheets-Sheet 3

INVENTORS
GEORGES BONNET
ANTOINE SALVI 3,166,707
NUCLEAR MAGNETOMETERS OF THE TYPE MAKING USE OF A HIGH FREQUENCY PUMPING ON AN ELECTRONIC TRANSITION
Georges Bonnet, Grenoble, France, and Antoine Salvi, Quartier des 3 Ponts, Pavillon 32, St.-Egreve, France; said Bonnet assignor to Commissariat à l'Energie Atomique, Paris, France, a society of France
Filed July 18, 1961, Ser. No. 126,829
Claims priority, application France July 18, 1960
4 Claims. (Cl. 324—.5)

The present invention is concerned with the absolute measurement of magnetic fields, in particular of small magnetic fields (lower than about 10 gauss) and more particularly with the very accurate measurement of the earth magnetic field (0.5 gauss) and of its variations, for instance for geophysical prospection purposes (discovery of ores and hydrocarbons) and for military purposes (detection of submarines, airplanes or missiles).

As a matter of fact, there are different types of nuclear magnetometers for the absolute measurement of magnetic fields, comprising at least one system of subatomic particles or atom portions (nuclei, electrons and so on) having an angular momentum $\bar{r}$ and a magnetic moment $\bar{m}$ (colinear with $\bar{r}$) different from zero (in the present description vectors are designated by letters provided with a bar above them), these particles being hereinafter called nuclear spins when they consist of atomic nuclei and electronic spins when they consist of electrons. These magnetometers are adapted accurately to determine the natural frequency, or Larmor frequency $f_0$, in the magnetic field $\bar{H}$ to be measured, of said particles, and in particular of the nuclear spins, this frequency $f_0$, which is that of the movement of precession of the resultant magnetic moment or total magnetization $\bar{M}$ of these particles about the direction of said field $\bar{H}$ (after or under the effect of a disturbance which has displaced the resultant magnetic moment $\bar{M}$ out of its position, under thermal equilibrium conditions, of alinement on the direction of $\bar{H}$) being strictly proportional to H in view of the following formula:

$$f = \frac{\gamma}{2\pi} H$$

in which $\gamma$ is the gyromagnetic ratio $\bar{m}/\bar{r}$ for the particles that are chosen ($\gamma$ is known with an approximation of $10^{-5}$ for hydrogen nuclei or protons).

It is possible to distinguish among the magnetometers in which the intensity of a magnetic field is measured by determining the Larmor frequency of the nuclear spins and in particular of the spins of the protons in this field, the following types:

(1) Nuclear absorption magnetometers, wherein an alternating magnetic field of a frequency $f$ close to $f_0$ is applied by means of a single electric circuit, this field serving to pass the nuclear spins from a lower energy state to a higher one by a transition which produces their precession at frequency $f_0$, the absorption of energy in the electric circuit being maximum when frequency $f$ is equal to $f_0$ (nuclear resonance phenomenon). In this first type of magnetometers means are provided for slightly varying $f$ and/or H (and therefore $f_0$) until resonance is obtained.

(2) Nuclear induction magnetometers, wherein, instead of detecting an absorption of energy in the circuit producing precession of the nuclear spins at frequency $f_0$, there is determined the frequency of the alternating current (which is also $f_0$) induced by the precession of the nuclear spins in a coil coupled with said spins and belonging to a second electric circuit. This second type of magnetometers may be divided into two groups, to wit:

(a) Magnetometers working in a continuous fashion, wherein a first electrical circuit produces, as in nuclear absorption magnetometers, precession of the nuclear spins, by applying thereto an alternating auxiliary field and a second circuit collects the nuclear precession signal by means of a coil coupled with said spins and determines the frequency of this signal by means of a frequencymeter.

(b) Magnetometers working in a discontinuous manner and sometimes called nuclear induction magnetometers (in the strict meaning of this term) wherein, during a first step, a polarizing auxiliary field, of a direction substantially perpendicular to that of the magnetic field $\bar{H}$ to be measured, is applied to produce misalinement of the resultant magnetic moment $\bar{M}$ with respect to the direction of $\bar{H}$ and, during a second step, after having suddenly turned off this polarization field, said resultant magnetic moment $\bar{M}$ is allowed to have a free movement of precession at the Larmor frequency $f_0$ about the direction of $\bar{H}$, the precession signal being collected in the form of an alternating electromotive force of frequency $f_0$ (after a transient period at the beginning of the second step) in a coil which generally also serves to apply the polarizing auxiliary field, owing to switch means coupling it alternately with a generator during the first step and with a frequencymeter during the second step.

It has been proposed to use in these types of magnetometers, no longer a single system of subatomic particles or atom portions, to wit atomic nuclei, but two systems. In particular it has been proposed, in the U.S. Patent No. 3,049,661 issued August 14, 1962, to make use simultaneously of a system of nuclear spins and a system of electronic spins, the sample of material having gyromagnetic properties that is used being a solution consisting of an hydrogenated solvent which contains nuclear spins consisting of protons and a paramagnetic substance (that is to say comprising unpaired electrons) the spectrum of which has a hyperfine structure and a splitting of the electronic resonance field in a magnetic field equal to zero, said substance being dissolved and ionized in said solvent. It is so possible to make use of ions of disulfonate of peroxylamine (also called nitrosodisulfonate) or of diphenyl-picryl-hydrazyl in water. In the above mentioned U.S. Patent No. 3,049,661 it was explained that, upon saturation of an electronic resonance line, of frequency F different from zero and substantially constant as long as the magnetic field remains low, by means of a high frequency field at said frequency F (which is of the order of 55–56 megacycles per second for potassium nitrosodisulfonate dissolved in water), the intensity of the nuclear resonance signal, the frequency of which (averaging 2000 cycles per second for protons) is strictly proportional to the intensity H of the magnetic field $\bar{H}$ to be measured, is considerably increased due to coupling between the nuclear spins and the electronic spins, saturation of the electronic resonance line having for its effect considerably to increase the polarization of the nuclear spins, that is to say the total magnetization $\bar{M}$. This increase of the nuclear signal permits an easy and accurate measurement of the intensity of a small magnetic field (lower than 10 gauss). To obtain such a saturation of an electronic resonance line, it is necessary to make use of two electric circuits, to wit a high frequency circuit tuned on the electronic resonance frequency (for instance 55–56 megacycles per second), to saturate an electronic resonance line, and a low frequency circuit tuned to the nuclear resonance frequency (for instance 2000 cycles per second) to detect the nuclear signal and to determine the frequency thereof. This arrangement may be applied to the different types of magnetometers above referred to in order to increase their sensitivity for measuring small field and in particular the earth magnetic field.

Thus, in the above-mentioned U.S. Patent No. 3,049,-661 there is described, with reference to FIGURE 3 thereof, a nuclear absorption magnetometer making use of two such spin systems (nuclear spins of the solvent and electronic spins of a dissolved paramagnetic substance), whereas with reference to FIGURES 4 and 5 of said patent and with reference to FIGURES 4 to 8 of U.S. Patent No. 3,049,662 issued August 14, 1962, there are described nuclear induction magnetometers of the continuous working type making use of two such systems of spins. Furthermore, in above-mentioned U.S. Patents Nos. 3,049,661 and 3,049,662 was indicated the possibility (provided that there was a sufficiently tight coupling between the nuclear spins and the coil of the low frequency circuit collecting the nuclear signal, this coil being incorporated in a resonant circuit tuned to the nuclear resonance frequency $f_0$ and having a sufficiently high Q factor) to obtain, due to the fact that the polarization of the protons was negative, an operation of the nuclear induction magnetometer as a self-oscillator of the "Maser" type (microwave amplification by stimulated emission of radiations) by stimulated emission of energy at the nuclear resonance frequency. As a matter of fact, saturation of the electronic resonance line constitutes a high frequency "pumping" on an electronic transition having for its effect, due to the coupling between electronic spins and nuclear spins, continuously to pass a portion of these last mentioned spins from a lower energy state to a higher energy state, the return, also continuous, to the lower energy state producing a stimulated energy emission at the frequency $f_0$ of the nuclear transition.

Finally, it has been proposed in the U.S. Patent Application Ser. No. 120,694 filed on June 29, 1961 by Georges Bonnet et al. and assigned to the same assignee, to make discontinuous operation nuclear induction magnetometers making use of a solution containing nuclear spins in the solvent and electronic spins in a paramagnetic substance of the above cited type dissolved in the solvent, polarization of the nuclear spins in the first step of the operation being ensured, on the one hand, concerning direction, by means of an auxiliary magnetic field of an intensity little higher than that of the field $\overline{H}$ to be measured and applied substantially at right angles to $\overline{H}$ preferably for a very short time (a little greater than the Larmor period, that is to say $1/f_0$) and on the other hand, concerning intensity, by saturation of an electronic resonance line of the paramagnetic substance.

It will be noted that all types of magnetometers (of the nuclear absorption type, of the nuclear induction type with continuous operation, of the nuclear induction type working in discontinuous fashion) comprise, when the substance having gyromagnetic properties consists of two systems of spins coupled together, in particular of nuclear spins of a solvent and of electronic spins of a paramagnetic substance of the above mentioned type:

(A) Means, consisting of high frequency electric circuit, for saturating an electronic resonance line of the electronic spins, this high frequency being of the order of 55–56 megacycles per second in the case of a solution of potassium nitrosodisulfonate;

(B) Means, consisting of a low frequency electric circuit, for detecting (by absorption or induction) the nuclear signal, this low frequency averaging 2000 cycles per second in the case where the nuclei are protons (solution in water or another hydrogenated solvent).

In most magnetometers, in particular in those described in the above stated patents or patent application, the high frequency circuit comprises a first coil, called H.F. coil, fed through an impedance matching device (having at least one variable capacitor) from a H.F. generator of conventional type at the electronic resonance frequency F, whereas the low frequency circuit comprises a second coil, called L.F. coil, generally belonging to a circuit adapted to be tuned to the nuclear resonance frequency $f_0$ in field $\overline{H}$, and means (such as a frequency-meter) for determining this frequency $f_0$.

Such an arrangement including H.F. and L.F. coils has many drawbacks.

(1) The proximity of these two coils with each other produces, if the axes of these two coils are not exactly at right angles to each other, a coupling between the corresponding H.F. and L.F. circuits which perturbs the measurement of the nuclear resonance frequency. It has been endeavoured to avoid this drawback:

Either by disposing the coils with their axes exactly at right angles to each other and also to the direction of the field $\overline{H}$ (because the saturation alternating field must be in a plane at right angles to $\overline{H}$ and the collecting coil must have its axis at right angles to $\overline{H}$ to have a good sensitivity), but in this case the magnetometer has a single preferential direction with respect to the field $\overline{H}$ to be measured, which is a serious drawback in the case of measurements of magnetic field by means of a magnetometer mounted on a land or air vehicle;

Or by disposing, between L.F. and H.F. coils disposed with their axes parallel to each other, a Faraday screen which reduces the coupling effect; this arrangement reduces the requirements concerning the direction of the apparatus, as it suffices to have the common axis of these two coils in a plane substantially perpendicular to $\overline{H}$.

(2) Due to the coupling between the two coils only a portion of the magnetic energy supplied by the high frequency circuit is used for saturating the electronic resonance line; the remainder is dissipated in the form of heat in the vicinity of the H.F. coil, partly in the low frequency circuit, partly in the Faraday screen, when there is one; furthermore, the electric field which is necessarily associated with the high frequency magnetic field, has a high intensity in the vicinity of the H.F. coil and it produces losses of energy by creation of eddy-currents in the liquid.

(3) When the frequency of the electronic resonance is of the order of magnitude of several tens of megacycles per second, the H.F. coil, which creates the electronic saturation field and which must, for reasons of adaptation, be capable of being tuned to this frequency by means of a capacitor included in the adaptation device, necessarily comprises a very small number of turns (for instance two or three turns); it follows that the field it creates is far from homogeneous and some portions of the liquid where there is a magnetic field too low to produce saturation of the electronic resonance line does not perform any function; on the other hand, it is not possible to increase this field beyond a given limit otherwise there would be produced in other portions of the liquid a field having too high an intensity which would give rise to a doubling or splitting of the lines; any choice that is adopted necessarily leads to an efficient utilization of only a relatively small portion of the volume of liquid.

The present invention, which is applicable to all the above mentioned types of magnetometers comprising as gyromagnetic sample two systems of spins (generally nuclear spins and electronic spins) and making use of a double resonance (one for every system of spins), has for its object to obviate the above mentioned drawbacks and in particular:

To reduce and even to eliminate coupling between the pumping high frequency circuit (electronic resonance frequency F) and the precession low frequency circuit (nuclear resonance frequency $f_0$);

To increase the symmetry, or isotropy, of the system of circuits so as to obtain a portable magnetometer which has not to be oriented in a preferential direction;

Considerably to reduce the losses of energy and in particular the Joule losses in the sample;

To increase the sensitivity of such magnetometers by a better utilization of the volume of the sample.

The present invention is concerned, in nuclear magnetometers where an electronic magnetic resonance line is at least partly saturated to increase nuclear polarization (high frequency pumping on an electronic transition), with the means for saturating the electronic line in order to give such magnetometers an excellent isotropy and a very high efficiency at frequencies of some tens of megacycles per second. It may be applied not only to magnetometers including a liquid sample with a hydrogenated solvent and a paramagnetic substance having a spectrum of hyperfine structure of the above mentioned type as used in the above mentioned prior patents and patent application but also to magnetometers comprising other samples (either liquid or solid) with two systems of spins.

The invention therefore has for its object a device for measuring the intensity of a magnetic field, in particular of a small magnetic field such as the earth field, comprising a vessel which contains a sample of a material containing a first system of spins having, in said field a resonance line adapted to be saturated at a first frequency, and a second system of spins coupled with the spins of the first system in such manner that saturation of said resonance line produces a polarization of the spins of the second system and increases the intensity of the signal of precession of the spins of the second system about the direction of said field at a second frequency lower than the first one and proportional to the intensity of said field; means for producing in said vessel an electromagnetic field at said first frequency to saturate, at least partly, said resonance line; means, and in particular at least one coil disposed around said vessel, to detect the signal of precession of the spins of the second system; and means for determining the frequency of the signal detected by said above mentioned means; and it is characterized by the fact that the means for producing an electromagnetic field comprise at least one coaxial electric line having an internal conductor and an external conductor short-circuited at one of their ends and energized at the other of their ends at said first frequency and by the fact that said vessel is housed between the external and internal conductors in at least one antinode or region of maximum intensity for the variations, in the longitudinal direction of the electric line, of the transverse magnetic field.

As a matter of fact, due to the short-circuiting, the coaxial line is the seat of stationary waves of the transverse magnetic field and of stationary waves of the transverse electric field, the antinodes of one of the fields being in the same transverse planes as the nodes of the other field. The vessel, or vessels, are placed at an antinode, or at antinodes, of the magnetic field where there is a maximum magnetic field (it is the useful field) and a minimum electric field (it is the field that produces the losses due to the electric conductivity of the sample).

Preferably, in order to avoid having to produce a high frequency electromagnetic field in regions where it is not useful, the sample occupies, on account of the requirements of insulation and liquid-tightness, the whole of the space comprised between the internal and external conductors. Consequently, since this sample must be located in a region where the magnetic field is maximum, this region is that which is adjacent to the short-circuit in the case of the single vessel and of a coaxial line having a length which is about 1/10 of the wavelength, in the corresponding sample, at the electronic resonance frequency F.

Preferred embodiments of the present invention will be hereinafter described with reference to the accompanying drawings, given merely by way of example and in which:

FIG. 2 is a perspective view of a portion of the vessel and of the external conductor of the magnetometer of FIG. 1;

FIGS. 4 and 5 show two different embodiments of a magnetometer according to this invention comprising two low frequency coils disposed about two vessels, housed, in the case of FIG. 4, inside the ends of two coaxial lines at right angles to each other and, in the case of FIG. 5, inside two portions of maximum magnetic field intensity of a single coaxial line bent at right angles.

Figure 9:
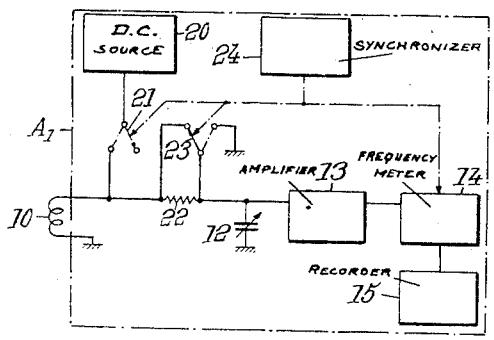
Figure 8:
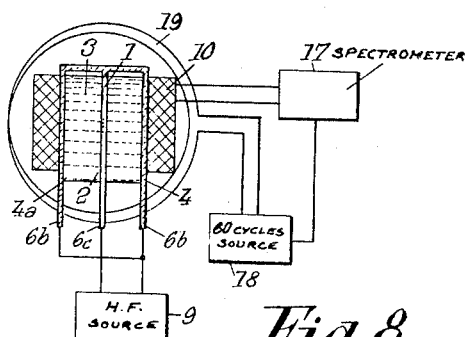

FIG. 8 diagrammatically shows a nuclear absorption magnetometer made according to the invention;

FIG. 9 is a block diagram on the low frequency circuit of a nuclear induction magnetometer working in a discontinuous manner, this diagram being adapted to be substituted for the portion A of the L.F. circuit of FIGS. 1, 4, 5 and 6.

Figure 1:
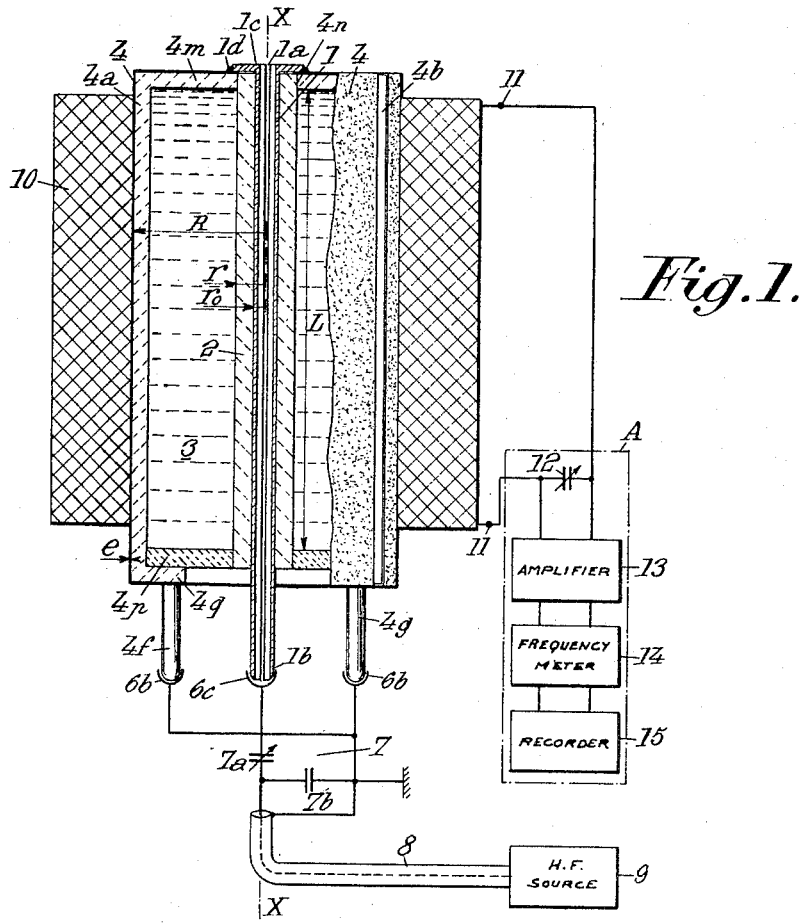
FIG. 1 shows a magnetometer made according to this invention, the coaxial line with the liquid sample vessel being shown partly in elevation and partly in section, whereas the electronic units for feed of current and measurement of Larmor frequency are shown in the form of blocks.

FIG. 10 is a cross-section of the coaxial line of FIG. 1 showing the saturation useful zone (cross-hatched) in the case where the axis of the coaxial line is at right angles to the field $\overline{H}$ to be measured.

Referring first chiefly to FIG. 1 and accessorily to FIGS. 2 and 10, it will be seen that, according to a preferred embodiment of the invention, the magnetometer comprises:

(1) A vessel made of a dielectric or insulating substance such as methyl-polymethacrylate (also known under the trade-mark "Plexiglas" and "Lucite") or a stratified resin and comprising:

An internal tube 2,
An external cylinder 4a comprising at one of its ends (the upper end in FIGS. 1 and 2) an end wall 4m provided with a hole 4n, in which tube 2 is fitted, and,
A plate 4p held by the inwardly bent edge 4q of cylinder 4a and glued to said edge to form a second end wall of said cylinder, plate 4p being also provided with a hole intended to receive the end of tube 2 opposed to that engaged in end wall 4m;

(2) A liquid (or possibly solid) sample 3 with two systems of spins, for instance a hydrogenated solvent such as water, in which is dissolved a paramagnetic substance having a spectrum of hyperfine structure in which, when the field is zero, there is a separation of the energy levels, that is to say an electronic resonance line saturable and of a frequency different from zero and substantially constant in a field equal, or very close, to zero; for instance, sample 3 may consist of an aqueous solution of potassium nitrodisulfonate $(SO_3)_2NOK_2$ of a concentration of one gram per liter;

(3) An electronic coaxial line comprising an internal conductor 1 (consisting of a tube provided with a longitudinal slit 1a, as shown, or possibly of a solid rod), made of copper or another metal which is a good conductor of electricity, and an external conductor 4 consisting advantageously of a very thin layer of copper or silver deposited on the external surface of cylinder 4a, this layer 4 being preferably separated into several zones by longitudinal strips such as 4b, 4c, 4d, where there is no deposit of copper or silver; the internal conductor which is housed in insulated tube 2 projects therefrom at its upper end to be electrically connected through a conducting plate 1c and a weld 1d to the longitudinal conducting layers of the external conductor 4, these zones being joined together at the top to form a circular ring as shown by FIG. 2, whereas the other end 1b of tube 1 constitutes a plug-in terminal; in a similar manner, each of the longitudinal conducting strips of the external conductor 4 is connected to a plug-in terminal 4e, 4f, 4g (strip 4e is not visible on FIG. 1 because it is located behind the section plane as in diagrammatic FIGS. 4 and 5).

By way of example, the dimensions may be as follows (see FIG. 1):

Inner diameter of cylinder 4a—R=23.5 mm.
External diameter of tube 2—r=7.5 mm.
Length of vessel 2, 4a—L=143 mm.
Radius of tube 1—$r_0$=3 mm.
Thickness of the layer forming conductor 4—e=0.020 mm.

The thickness of tube 1 (which constitutes the internal conductor), that of tube 2, and that of tube 4a are not critical but preferably they should be as small as possible while ensuring a good mechanical strength of these elements.

Concerning the arrangement of external and internal conductors it will be noted that the presence of a metallized cylinder in the internal volume of the coil 10 of the low frequency circuit (hereinafter described) introduces, by a coupling effect, a resistor loss and a reduction of inductance. This effect is obviated by forming slits in the metal 4 of the vessel or cylinder 4a, in a direction parallel to the longitudinal axis XX and by limiting the thickness e of the metallic layer to some tens of microns. It is for the same reason that the internal conductor 1 consists of a tube provided with a slit 1a. It has been found that three slits are sufficient in the conductor layer 4.

(4) means for feeding coaxial line 1, 4 with current at high frequency F; these means which form, together with the coaxial line, the means for saturating the electronic resonance line comprise:

A H.F. generator 9 delivering 5 watts (under 50 ohms) at the pumping frequency (56 megacycles per second in the case of nitrosodisulfonate in a field of low intensity), A coaxial cable of the 50 ohms and small diameter type having a length of 30 meters for instance to prevent generator 9 from exerting an influence upon the H.F. circuit;

A conventional device 7 for impedance matching between generator 9 and coaxial line 1, 4, this device comprising for instance a fixed capacitor 7b (of 2500 microfarads) and a variable capacitor 7a (ranging from 0.070 and 0.150 microfarads) and having at its output four sockets, to wit a central socket 6c for central plug-in pin 1b provided at the end of internal conductor 1 and three peripheral sockets 6b (only two of which are visible on FIGS. 1–4–5 and 8) intended to accommodate pins 4e, 4f and 4g, The lower end of line 1, 4 being therefore excited by generator 9 through matching circuit 7, at the pumping frequency.

(5) A low frequency circuit comprising:

A coil 10 comprising a great number of turns of thin wire (for instance several thousands of turns of copper wire of 4 mm. cross-section and enamelled) wound about coaxial line 1, 4 with its axis in coincidence with the axis XX of this line, this coil being intended to collect the nuclear signal.

A variable capacitor 12 connected across the terminals 11 of coil 10 to form a resonating circuit tunable on the nuclear resonance frequency $f_0$ (about 2000 cycles per second for protons in the earth field);

A conventional low frequency amplifier 13 capable of amplifying the alternating voltage delivered by oscillating circuit 10–12 due to the coupling between the nuclear spins and coil 10 when these spins undergo a precession, A frequency-meter 14 of a suitable type to measure the frequency of the oscillations amplified by amplifier 13, A recorder 15, of the analog or digital type, recording the successive values measured by frequency-meter 14;

Each of the units 13, 14, 15 being well known in the art and being described in the above mentioned U.S. Patent No. 3,049,662 and the system A formed by capacitor 12 and units 13, 14 and 15 forming a device, known in itself, for measuring the frequency $f_0$ of the alternating voltage induced in coil 10 and which is strictly proportional to the intensity H of the magnetic field $\overline{H}$ to be measured.

Preferably, this system A is of the type described in U.S. Patent No. 3,049,662 so that the magnetometer of FIG. 1 constitutes a self-oscillator of the "Maser" type, saturation of one resonance line of the electronic spins of liquid 3 by the H.F. circuit 9, 8, 7, 1 having for its effect to produce, by coupling between the electronic spins and the nuclear spins of this liquid and by coupling between these nuclear spins and coil 10, a stimulated emission of energy at frequency $f_0$ in the L.F. circuit 10, 12, provided that this circuit has a sufficiently high quality or Q coefficient.

Figure 3:
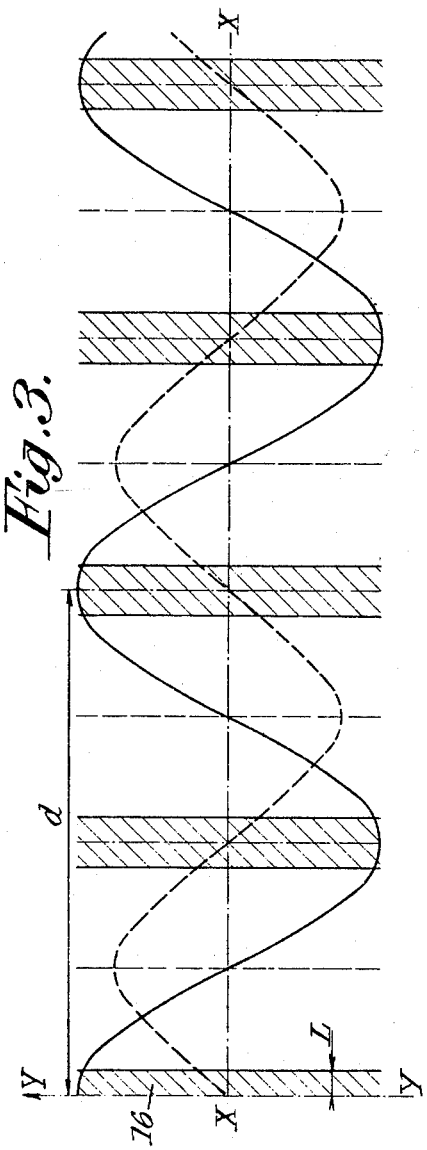
FIG. 3 shows the curves illustrating the longitudinal variations of the magnetic field (in solid lines) and of the electric field (in dotted lines) in a coaxial line of the type used in a magnetometer according to this invention.

Before describing the other possible embodiments of a magnetometer according to the invention, we will describe, with reference to FIGS. 3 and 10, the distribution of the magnetic and electric fields in the coaxial line and the efficiency of the magnetic field in this line according to the position thereof with respect to the field $\overline{H}$ to be measured.

It is known that in a coaxial electric line, the magnetic field and the electric field are transverse fields (TEM mode); furthermore, if this line is short-circuited at one end (at the top end of FIG. 1), magnetic and electric stationary waves are formed with an antinode for the magnetic field and a node for the electric field in the plane of short-circuiting and a distribution of the nodes and antinodes in planes at a distance from each other equal to d/4, d being the wave length at frequency $f_0$ in liquid 3. The longitudinal variations, at some distance from the axis XX of the coaxial line, have been shown both for the magnetic field (in solid lines) and for the electric field (in dotted lines) as a function of the distance from the plane YY of short-circuiting (this plan being perpendicular to axis XX), the distances being plotted in abscissas and the fields in ordinates.

According to this invention the sample of liquid (or solid) material must be placed inside the coaxial line in regions (antinodes) where the intensity of the magnetic field is maximum; these are the cross-hatched zones of FIG. 3. In the case of a single vessel, this vessel would be located in zone 16 close to the short-circuit plane, the length L of this zone being a small portion (about 1/10) of the wave length d. In the case where the sample is disposed in several regions (as in the embodiment of FIG. 5) these regions are separated by distances nd, n being an integer and they are located at antinodes (either successive or not) of the magnetic field.

This condition concerning the location of the sample at antinodes of the magnetic field has two useful results:

The sample is in a region where the magnetic field, the only one to be useful, is maximum,
The electric field being minimum in the regions where the magnetic field is maximum, the losses resulting from the electric conductivity of the liquid are reduced to a minimum.

On the other hand, the desired saturation of the electronic resonance line is obtained only in the regions of the liquid volume where the intensity of the pumping magnetic field has, in projection on a plane perpendicular to the permanent magnetic field $\overline{H}$ to be measured, a value greater than a given limit $H_{min}$.

We thus define a "filling coefficient" which is the ratio of the useful volume of the sample to its total volume and the amplitude of nuclear polarization obtained by H. F. pumping depends directly upon this ratio.

In the case of a coaxial line, the lines of force of the magnetic field with the TEM mode are circles perpendicular to the axis XX of the line and having their centers on this axis, the intensity of this field at a given point being proportional to the intensity of the electric current flowing through the internal conductor 1 at the level of this point and also inversely proportional to the distance of this point from axis XX.

It follows that when the permanent field $\overline{H}$ to be measured is parallel to the axis XX of coaxial line 1, 4 the useful volume is that of a circular cylinder located about the axis and the diameter of which depends upon the intensity of the current flowing through the line. The filling coefficient is equal to one if this intensity has a volume higher than or equal to a limit $I_0$ which depends upon the radius R of the external conductor (the exact value is $I_0 = \frac{1}{2} R H_{min}$, $H_{min}$ being the minimum value of the amplitude of the pumping magnetic field below which electronic saturation produces a polarization insufficient to permit an efficient measurement).

If, on the contrary, the permanent field $\overline{H}$ to be measured is located in a plane perpendicular to the axis (as illustrated by FIG. 10 which is a cross-sectional view of the coaxial line), the useful zone comprises only a portion of the total volume, this useful zone being shown by cross-hatching on FIG. 10. In particular if the current is equal to the above mentioned limit $I_0$, the filling coefficient is equal to 0.5.

The difference between the filling coefficient for the axial positioning and that for the transverse positioning of the permanent field $\overline{H}$ is reduced by making use of a current higher than this limit $I_0$. Furthermore, if it is considered that the direction of the permanent field in the transverse plane has no influence for reasons of symmetry, it will be seen that it is easy to obtain by means of a coaxial line 1, 4 a distribution leading to a nearly isotropic filling coefficient and therefore to a nearly constant sensitivity for the H.F. circuit.

As for the choice of radius R and of the radius r of the insulating cylinder surrounding the internal conductor, it should be noted that the ratio of the maximum value of the electric field to the minimum value of the magnetic field inside the vessel at a given level is proportional to $R/r$, whereas the filling coefficient, for a given value of R and a given current, increases when R increases. There is therefore an optimum value of this ratio $R/r$, which value, according to our experiments, is close to 3.

As for the disturbances that might be brought into the low frequency circuit (nuclear resonance frequency) by the high frequency field, they are eliminated in a remarkable manner. As a matter of fact, there can be no coupling of a magnetic nature since the magnetic field in the coaxial line arranged in TEM mode is perpendicular to its axis and has an axial symmetry (however there is one exception corresponding to the embodiments of FIGS. 6 and 7). There is produced a magnetic induction flux equal to zero through the low frequency coil. On the other hand the electric field is zero in the space external to the coaxial line 1, 4 since the electromagnetic radiation is enclosed inside the external conductor 4.

Limitation in space of this electromagnetic radiation contributes in reducing the energy losses which are already limited due to the low value of the electric field to magnetic field ratio. For the same purpose, we eliminate any electrical contact between the liquid and the conducting surfaces, by making tube 2 and cylinder 4a of an insulating substance.

It will thus be seen that with a sufficient intensity of the current for energizing coaxial line 1, 4, that is to say in the case of a filling coefficient close to 1 for the transverse magnetic fields $\overline{H}$, the whole of the H.F. circuit and of the vessel containing the sample having two spins systems has a practically perfect isotropy, which means that the intensity of the nuclear precession signal at frequency $f_0$, about the direction of field $\overline{H}$ depends little upon the direction of the coaxial line with respect to this direction.

In order to obtain that the nuclear signal induces in the L.F. coil 10 a substantial alternating voltage of the same frequency $f_0$, it is necessary to have the axis XX of coil 10 located at a substantial angle, preferably close to 90°, with the direction of field H.

It should be understood that it is of interest, in order to obtain the best advantage of the nearly complete isotropy resulting from saturation of the electronic resonance line by means of a coaxial line in which the sample having gyromagnetic properties is housed, also to provide a practically isotropic arrangement of the L.F. circuit. We may for instance provide two coils 10b, 10c, for collecting the precession nuclear signal, these coils being mounted with their respective axes at right angles to each other and being connected either in series or in shunt. Owing to this arrangement, the permanent magnetic field $\overline{H}$ to be measured always has, whatever be its position with respect to the axes of these two coils 10b, 10c, a component perpendicular to one or the other of these coils; therefore the nuclear signal will induce in this particular coil a substantial alternating electromotive force. The total electromotive force collected by the two coils 10b, 10c, in series or in shunt, will vary only in the ratio 1/2 according to the direction of $\overline{H}$ with respect to the axes of coils 10b and 10c. We thus obtain a nearly complete isotropy of the magnetometer which then has three degrees of freedom.

Three embodiments of magnetometers made according to this invention and including two L.F. coils 10b and 10c are diagrammatically illustrated by FIGS. 4, 5 and 6–7.

The embodiment of FIG. 4 comprises two coaxial lines 1, 4 of the type illustrated by FIG. 1, each surrounded by one of the coils 10b and 10c. The two lines are disposed with their respective axes perpendicular to each other and are energized in shunt through their pins 1b, 4f from terminals 16b, 16c connected through a matching device (not shown) to a H.F. generator 9. A system similar to the system A of FIG. 1 treats the nuclear signals collected by coils 10b, 10c and available at terminals 11b, 11c.

On the contrary, the embodiment of FIG. 5 comprises a single coaxial line 1, 4 bent at right angles (or two portions of coaxial lines having their respective axes perpendicular to each other connected through a right angles connection) in which are housed two vessels 2, 4a containing a liquid 3, of the type illustrated by FIG. 1, separated by a distance equal to one half of the wavelength in liquid 3 at the frequency F of the energizing source 9 (the impedance matching circuit being not shown). To be more accurate, distance $L_1$ is equal to $d/2$ so that the center of the vessel having an horizontal axis is located at an antinode of the magnetic field. Two coils 10b, 10c for collecting the nuclear signal are disposed above the two vessels 2, 4a and the total signal, available at terminals 11b, 11c is treated by a system A similar to that of FIG. 1.

Figure 7:
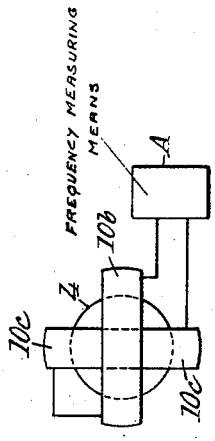
FIGS. 6 and 7 are diagrammatical views, respectively in section along line VI—VI of FIG. 7 and in plane view from above, of a magnetometer according to the invention, having a single coaxial line and a single vessel but having two L.F. coils.
Figure 6:
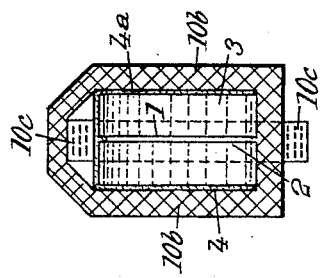

In the embodiment of FIGS. 6 and 7 we make use of a single rectilinear coaxial line 1, 4 identical to that shown in detail on FIG. 1 with the same energizing means and the same arrangement of the vessel 2, 4a containing the liquid 3. However, two L.F. coils 10b, 10c having their respective axes perpendicular to each other and to the axis of the coaxial line 1, 4 are provided for collecting in two perpendicular planes respectively the nuclear signal produced by the nuclear spins of sample 3 when the electronic spins of this sample are subjected to the H.F. field at the electronic resonance frequency in the presence of the field $\overline{H}$ to be measured. The total nuclear signal that is collected is treated in a system A analogous to that of FIG. 1. As a matter of fact, the arrangement of FIGS. 6 and 7 is identical to that of FIG. 1 with the exception that the single L.F. coil 10 of FIG. 1 is replaced by two coils 10b, 10c having their respective axes perpendicular to each other and to XX and connected in series (they might also be connected in shunt).

The magnetometers of FIGS. 4, 5, 6, 7 have a nearly perfect isotropy, which is advantageous when these magnetometers are to be mounted on a motor vehicle or an airplane. With the arrangements of FIGS. 1-2, 4, 5, 6-7 it is possible to obtain not only nuclear induction magnetometers working in continuous fashion, in particular of the "Maser" type, but also nuclear absorption magnetometers and nuclear induction magnetometers working in a discontinuous fashion.

In all these apparatus, we provide of course valves (not shown) for feeding and emptying vessel 2, 4a.

FIG. 8 shows a nuclear absorption magnetometer comprising a H.F. unit identical to that of FIG. 1 (the matching device being not shown). The L.F. circuit further comprises a coil 10, a spectrometer 17 of the type described by Pound and Knight in an article of the "Review of Scientific Instruments," vol. 21, p. 219–225 (1950) and a conventional generator 18 of 50 cycles per second type (for European use) or 60 periods per second (for U.S. use) and a coil 19 fed with current from this generator 18 to produce a periodical variation of the total magnetic field to which liquid 3 is subjected, resonance producing in the spectrometer a maximum of absorption which is detected by comparison with the oscillations of generator 18 in spectrometer 17 which also receives these oscillations. This permits of determining the intensity H of the field $\overline{H}$ to be measured by means of a formula $$f_1 = \frac{\gamma}{2\pi}(H+h)$$

($f_1$ being the resonance frequency, $\gamma$ the gyromagnetic ratio of the nuclear spins of sample 3 and $h$ the intensity of the field produced by coil 19 at the time of resonance). Details upon the L.F. circuit and the field sweep circuit are to be found in books relative to magnetic resonance (for instance Andrew: Nuclear Magnetic Resonance, Cambridge University Press 1958, page 35 and sequ.), in the above mentioned U.S. Patent No. 3,049,661 and also the above mentioned article of Pound and Knight.

Finally, on FIG. 9 we have illustrated the L.F. circuit comprising coil 10 in the case of a nuclear induction magnetometer of the discontinuous operation type described in the above mentioned patent application Ser. No. 120,-694, the coaxial line, the vessel and the means for energizing the coaxial line being identical to those illustrated by FIGS. 1 and 2. This L.F. circuit comprises:

A direct current source 20 adapted during a first step of the operation (when switch 21 is closed, that is to say in the position in dotted lines) to supply coil 10 with current to create an auxiliary magnetic field which ensures polarization in direction of the nuclear spins of sample 3 whereas their polarization in intensity is produced by saturation of the electronic spins of this sample by the H.F. circuit of FIG. 1);

A resistor 22 capable of absorbing, immediately after this auxiliary field has been turned off by opening switch 21, the parasitic or transient oscillations, when switch 23 is in the position shown in dotted lines, A variable capacitor 12 connected to coil 10 to form an oscillating circuit tunable on frequency $f_0$, when switch 23 is in the position in solid lines and short-circuits resistor 22, An amplifier 13 for amplifying the oscillations of oscillating circuit 10–12, a frequency-meter 14 to determine the frequency of these oscillations and a recorder 15 to record the successive indications of frequency-meter 14, A synchronizer 24 operating, according to a given program, switch 21, switch 23 and frequency-meter 14.

Information concerning the L.F. circuit of FIG. 9 and its operation are to be found in the above-mentioned U.S. Patent Application Ser. No. 120,694 and in the U.S. patent 2,561,490 of July 24, 1951 (the arrangements of the last mentioned patent do not comprise a polarization by saturation of an electronic resonance line).

FIG. 9 and the short description thereof are merely intended to show that by substituting for the system A of FIG. 1 (or of FIGS. 4, 5 or 6–7) the system $A_1$ of FIG. 9 it is possible to obtain a discontinuous operation nuclear induction magnetometer according to the present invention.

The material containing two spins systems (nuclear spins and electronic spins) used as sample may be one of the following solutions:

Potassium or sodium nitro sodisulfonate dissolved in water, pyridine or formamide;

Diphenyl-picrylhydrazyl, dissolved in benzene or in other organic products;

Tetraphenylstibonium nitrosodisulfonate dissolved in ether;

Picryl-aminocarbazyl dissolved in benzene;

Ions of a semiquinone, such as $(O=C_6H_4-O)-$, dissolved in water.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. In a device for measuring the intensity of a magnetic field and comprising at least one vessel including a sample of matter containing a first system of spins having in such a field a resonance line saturable at the first frequency by an electro-magnetic field produced in said vessel and a second system of spins coupled with the first system so that saturation of this line produces a polarization of the spins of the second system and increases the intensity of the signal of precession of said spins of the second system about the direction of the magnetic field to be measured at a second frequency lower than said first frequency and proportional to the intensity of said magnetic field to be measured, which frequency is measured after detection of said signal, the combination with said vessel of an electric coaxial line including an internal conductor and an external conductor arranged to house said vessel between them, said conductors being short-circuited at one of their ends, the length of said coaxial line being at most one tenth of the wavelength in said matter at said first frequency, means at the other ends of said conductors for energizing said coaxial line at said first frequency, said means including a high frequency generator and a tuning capacitor connected with said conductors so as to constitute therewith a circuit tuned to said first frequency, the region of the space between said conductors where said vessel is located corresponding to an antinode of the variation along the axis of said coaxial line of the transverse magnetic field produced by said energizing means, and at least one coil mounted around said coaxial line for detecting said signal of precession.

2. In a device for measuring the intensity of a magnetic field and comprising at least one vessel including a sample of matter containing a first system of spins having in such a field a resonance line saturable at a first frequency by an electro-magnetic field produced in said vessel and a second system of spins coupled with the first system so that saturation of this line produces a polarization of the spins of the second system and increases the intensity of the signal of precession of said spins of the second system about the direction of the magnetic field to be measured at a second frequency lower than said first frequency and proportional to the intensity of said magnetic field to be measured, which frequency is measured after detection of said signal, the combination with said vessel of an electric coaxial line including an internal conductor and an external conductor arranged to house said vessel between them, said conductors being short-circuited at one of their ends, the length of said coaxial line being at most one tenth of the wavelength in said matter at said first frequency, means at the others ends of said conductors for energizing said coaxial line at said first frequency, said means including a high frequency generator and a tuning capacitor connected with said conductors so as to constitute therewith a circuit tuned to said first frequency, the region of the space between said conductors where said vessel is located corresponding to an antinode of the variation along the axis of said coaxial line of the transverse magnetic field produced by said energizing means, and two coils having their respective axes perpendicular to each other and mounted around said coaxial line for detecting said precession signal.

3. A combination according to claim 2 further comprising a second vessel containing a sample of the same matter, and a second coaxial line at right angles to the first one and housing said second vessel between its conductors, in the same manner as said first vessel is housed in the first coaxial line, said two lines being connected in shunt with said energizing means, said two coils surrounding said two coaxial lines, coaxially therewith, the length of said second coaxial line being at most one tenth of the wave length in said matter at said first frequency.

4. A combination according to claim 2 wherein said vessel substantially fills the space between said internal and external conductors, said two coils surrounding said coaxial line and being disposed so that the axis of said line is perpendicular to the respective axes of said coils and passes through the point of intersection of said axes.

References Cited in the file of this patent
UNITED STATES PATENTS
2,990,518    Braunstein _____ June 27, 1961

OTHER REFERENCES

McWhorter et al.: Physical Review, vol. 109, No. 2, Jan. 15, 1958, pp. 312 to 318.

Feher, Physical Review, vol. 114, No. 5, June 1, 1954, page 1224 relied upon.

Feher et al.: Physical Review, vol. 98, No. 2, Apr. 15, 1955, pp. 337–348 incl.

Belgers et al.: Physical Review, vol. 95, No. 6, Sept. 15, 1954, page 1683.

Pipkin et al.: Physical Review, vol. 109, No. 5, Mar. 1, 1958, pp. 1423 to 1439.